US008342711B2

(12) United States Patent
Lin et al.

(10) Patent No.: US 8,342,711 B2
(45) Date of Patent: Jan. 1, 2013

(54) LIGHT-EMITTING UNIT ADAPTER MODULE

(75) Inventors: Hsuan-Chih Lin, Taipei County (TW); Hong-Long Chen, Taiwan County (TW)

(73) Assignee: Kwo Ger Metal Technology, Inc., Taipei Hsien (TW)

( * ) Notice: Subject to any disclaimer, the term of this patent is extended or adjusted under 35 U.S.C. 154(b) by 401 days.

(21) Appl. No.: 12/785,850

(22) Filed: May 24, 2010

(65) Prior Publication Data

US 2010/0315815 A1 Dec. 16, 2010

(30) Foreign Application Priority Data

Jun. 16, 2009 (TW) ................................ 98120141 A

(51) Int. Cl.
*F21S 4/00* (2006.01)
*B60Q 1/00* (2006.01)

(52) U.S. Cl. ................... 362/249.02; 362/294; 362/373; 362/249.01

(58) Field of Classification Search ............ 362/249.01–249.06, 294, 373, 240, 238, 311.02, 368, 362/547, 800
See application file for complete search history.

(56) References Cited

U.S. PATENT DOCUMENTS

| | | | | |
|---|---|---|---|---|
| 6,552,658 | B1 * | 4/2003 | Roller et al. | 340/475 |
| 7,654,688 | B2 * | 2/2010 | Li et al. | 362/240 |
| 8,038,328 | B2 * | 10/2011 | Lin et al. | 362/368 |
| 2007/0285926 | A1 * | 12/2007 | Maxik | 362/294 |
| 2008/0043472 | A1 * | 2/2008 | Wang | 362/294 |
| 2010/0302778 | A1 * | 12/2010 | Dabiet et al. | 362/249.02 |

* cited by examiner

*Primary Examiner* — Bao Q Truong
(74) *Attorney, Agent, or Firm* — Muncy, Geissler, Olds & Lowe, PLLC

(57) ABSTRACT

A light-emitting unit adapter module includes a mounting base for mounting, a circuit board accommodated in the mounting base and having electrode pins connectable to an external power source, a light-emitting unit mountable in the mounting base, and a holding-down device fastenable to the mounting base to hold down the light-emitting unit, keeping the tubular electrodes of the light-emitting unit in positive contact with the electrode pins of the circuit board for power input and the heat sink of the light-emitting unit suspending outside the mounting base for quick dissipation of waste heat during operation of the light-emitting devices of the light-emitting unit.

10 Claims, 8 Drawing Sheets

LIGHT-EMITTING UNIT ADAPTER MODULE

This application claims the priority benefit of Taiwan patent application number 098120141, filed on Jun. 16, 2009.

BACKGROUND OF THE INVENTION

1. Field of the Invention

The present invention relates to light-emitting device mounting technology and more particularly, to a light-emitting unit adapter module, which facilitates mounting and dismounting of the light-emitting unit, avoids heat accumulation and effectively seals off outside moisture.

2. Description of the Related Art

In order to slow down and eventually reverse global warming, many countries around the world are actively applying energy saving and carbon reduction action plains. These action plains may include planting trees and using power-saving electronic products. Nowadays, LED (light emitting diode) has been intensively used in lamp bulb, lamp tube, desk lamp, hand light, backlight, vehicle light and many other lighting fixtures and electronic products. However, only high-performance light-emitting devices can be used for lighting fixture. For use in a lighting fixture, light-emitting chips are bonded to a circuit board, which provides electrical power to the light-emitting chips and control their operation. Although LED has power-saving and high brightness characteristics, its lifespan is limited. During operation of a LED lamp, much waste heat is produced and must be quickly carried away. Accumulation of waste heat will cause the LED lamp to fail soon.

In actual practice, the use of conventional LED apparatus may encounter many problems as follows:

1. When multiple LEDs are bonded to a circuit board to constitute a LED lamp bulb or lamp tube, the maintenance work is complicated. When one LED fails, the whole lamp bulb or lamp tube may have to be thrown away and replaced by a new one. It is a waste to thrown away the whole lamp bulb or lamp tube. However, it is difficult to pick up the other normal LEDs from the failed lamp bulb or lamp tube.

2. A LED lighting fixture has multiple LEDs or light-emitting chips mounted on a circuit board that provides electrical power to the LEDs or light-emitting chips and control their operation. After installation of the LEDs or light-emitting chips in the circuit board, the LEDs or light-emitting chips are not detachable from the circuit board. When one LED or light-emitting chip failed, the circuit board becomes useless, causing waste.

3. When the LED module of a lighting fixture failed and replaced by a new one, the new LED module must be examined to assure positive transmission of power supply. Further, during operation of the LED module, waste heat may be accumulated in the lighting fixture, affecting the performance and shortening the service life.

Therefore, it is desirable to provide a measure or structure that eliminates the aforesaid problems of complicated light-emitting device installation and repair work and accumulation of waste heat.

SUMMARY OF THE INVENTION

The present invention has been accomplished under the circumstances in view. It is therefore the main object of the present invention to provide a light-emitting unit adapter module, which dissipates waste heat rapidly to avoid heat accumulation, facilitates maintenance and repair, and effectively seals off outside moisture.

To achieve this and other object of the present invention, a light-emitting unit adapter module comprises a mounting base for mounting, a circuit board accommodated in the mounting base, a light-emitting unit mountable in the mounting base and having tubular electrodes that are respectively press-fitted onto the electrode pins of the circuit board for positive power input upon insertion of the light-emitting unit into the mounting base, and a holding-down device detachably threaded onto the mounting base to hold down the light-emitting unit in the mounting base.

Further, when mounting the mounting base of the light-emitting unit adapter module on an external heat dissipation structure, a gasket ring is set in between the mounting base and the external heat sink around the heat sink of the light-emitting unit to seal off outside moisture.

Further, the holding-down device can be formed of a holding-down cap, holding-down screws, holding-down spring screws, buckles or any other retainer means practical for holding down the light-emitting unit in the accommodation chamber of the mounting base.

Further, the mounting base has a center opening. The light-emitting unit comprises a holder member having a center opening corresponding to the center opening of the mounting base, a circuit substrate carrying the tubular electrodes and accommodated in the holder member, a plurality of light-emitting devices mounted on the circuit substrate and a flat heat sink mounted on the bottom side of the circuit substrate and bonded with a cooling pad and extending out of the center opening of the holder member, and a packing lens molded on the circuit substrate over the light-emitting devices. After the holding-down device is fastened to the mounting base to hold down the light-emitting unit in the mounting base, the flat heat sink of the light-emitting unit extends through the center opening of the mounting base to the outside of the mounting base and attachable to an external heat dissipation structure for quick dissipation of waste heat from the light-emitting devices.

Further, the mounting base has a plurality of mounting portions, for example, mounting lugs outwardly protruded from and equiangularly spaced around the periphery for mounting.

Further, a positioning unit is provided between the mounting base and the holder member of the light-emitting unit to prohibit rotation of the light-emitting unit relative to the mounting base. The positioning unit comprises a plurality of male positioning members, for example, positioning ribs located on the inside wall of the mounting base, and a plurality of female positioning members, for example, positioning grooves located on the outside wall of the holder member of the light-emitting unit for receiving the positioning ribs to prohibit rotation of the light-emitting unit relative to the mounting base.

DETAILED DESCRIPTION OF THE PREFERRED EMBODIMENT

Figure 1:
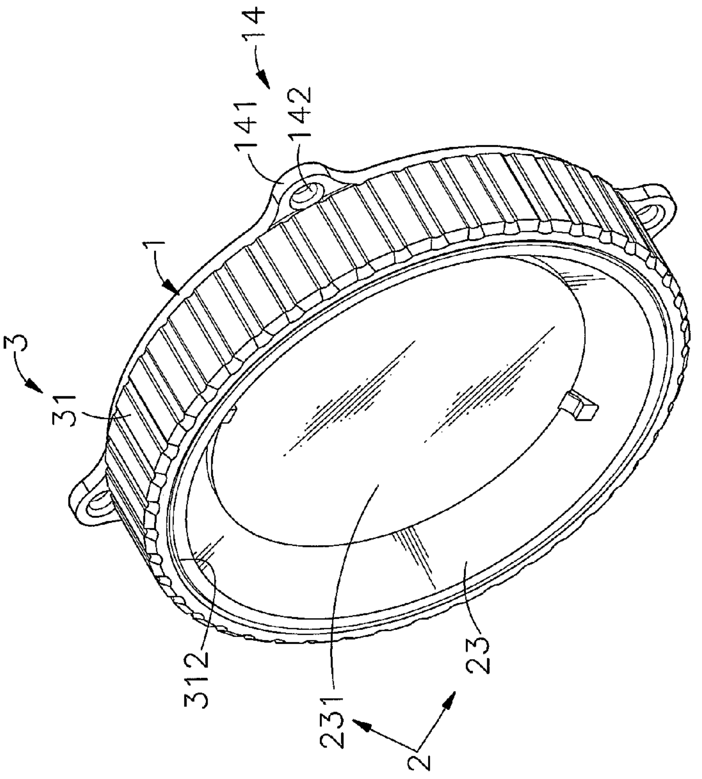
FIG. 1 is an oblique elevation of a light-emitting unit adapter module in accordance with the present invention.
Figure 2:
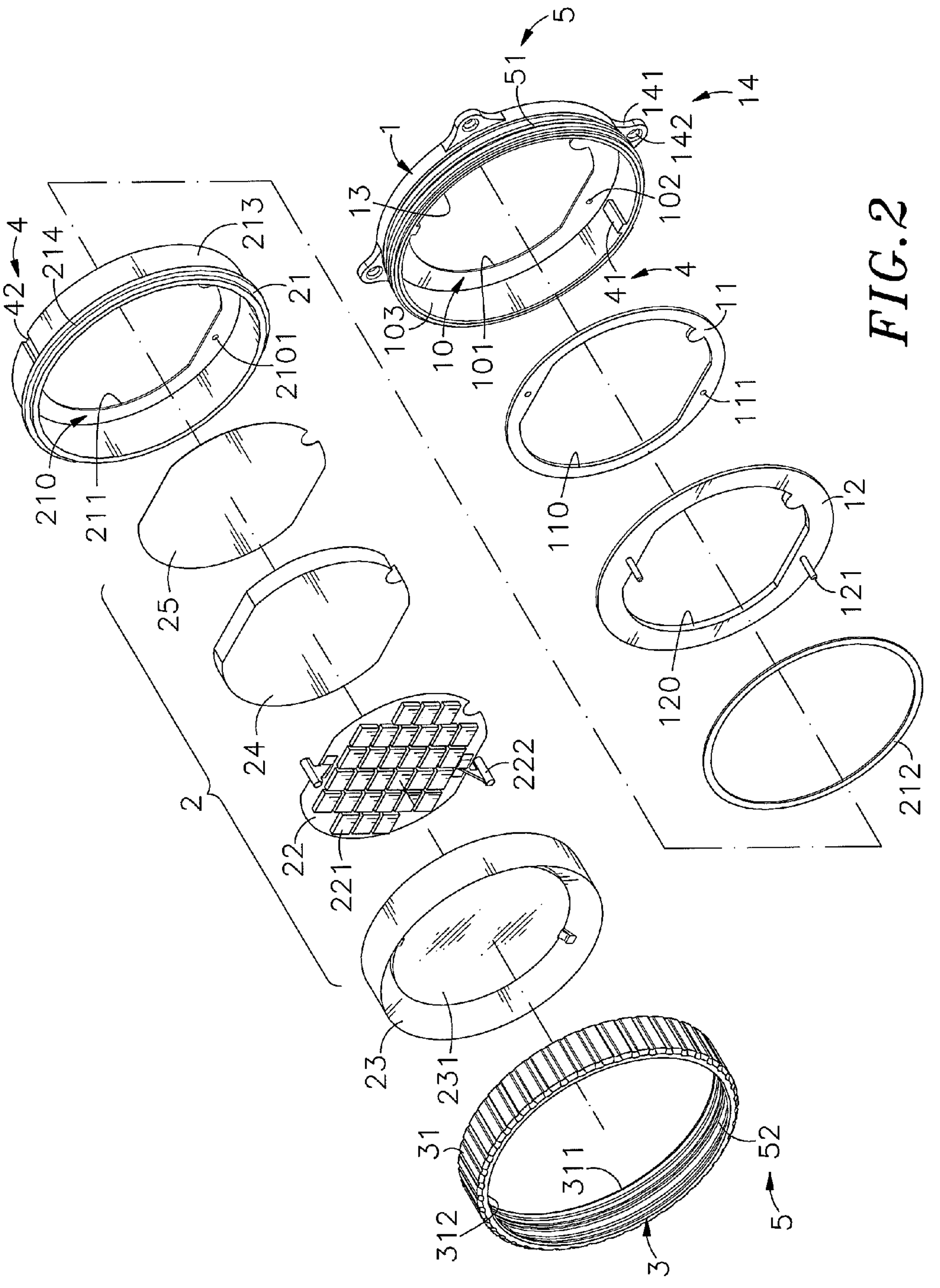
FIG. 2 is an exploded view of the light-emitting unit adapter module in accordance with the present invention.
Figure 3:
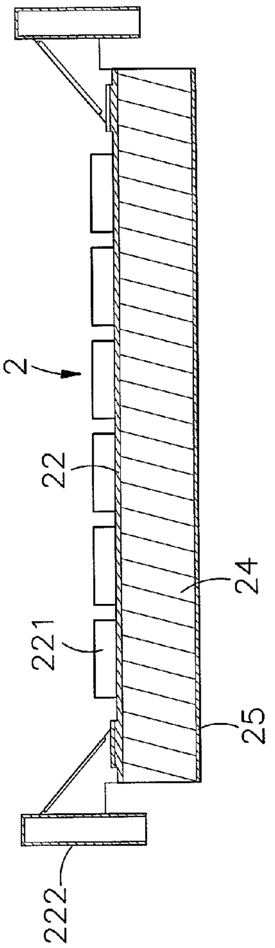
FIG. 3 is a sectional view of a part of the light-emitting unit adapter module in accordance with the present invention, showing the structure of the light-emitting unit before packaging.
Figure 4:
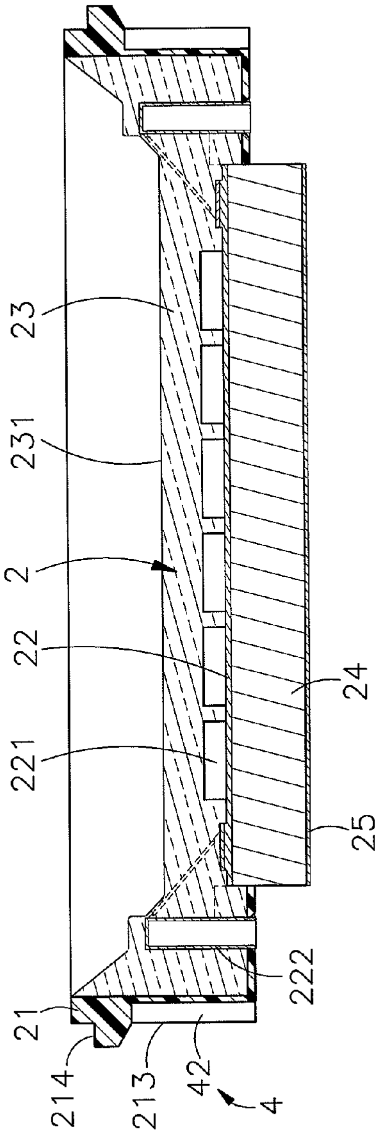
FIG. 4 is a sectional view of the light-emitting unit in accordance with the present invention.
Figure 5:
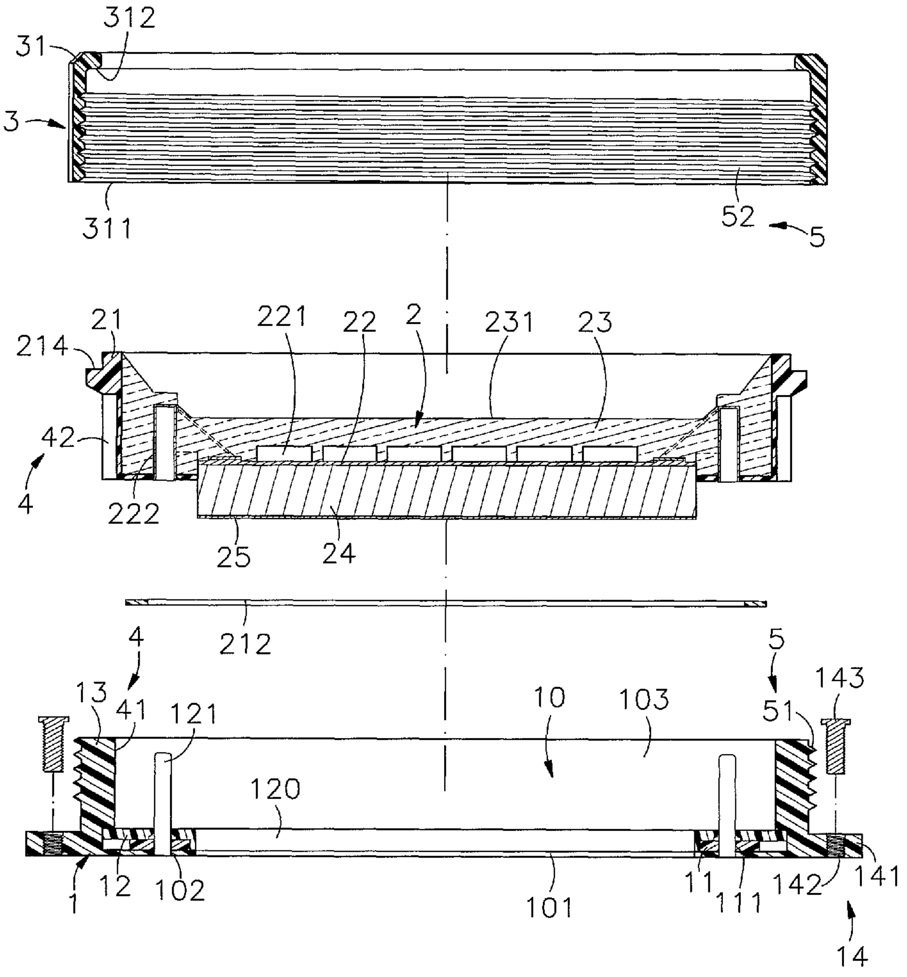
FIG. 5 is a sectional exploded view of the light-emitting unit adapter module in accordance with the present invention.

Referring to FIGS. 1~5, a light-emitting unit adapter module in accordance with the present invention is shown comprising a mounting base 1, a light-emitting unit 2, a holding-down device 3, and a connection unit 5.

The mounting base 1 has an accommodation chamber 10 defined therein, a center opening 101 cut through the bottom wall of the accommodation chamber 10, a plurality of locating holes 102 located on the bottom wall of the accommodation chamber 10 and spaced around the center opening 101, a connection portion 13 extending around the periphery of the accommodation chamber 10 and a plurality of mounting portions 14, for example, mounting lugs 141 perpendicularly extended from and equiangularly spaced around the connection portion 13. Further, the mounting base 1 accommodates a spacer member 11 and a circuit board 12 in the accommodation chamber 10. The spacer member 11 is set between the bottom wall of the accommodation chamber 10 and one side of the circuit board 12, having a center opening 110 corresponding to the center opening 101 of the mounting base 1 and a plurality of through holes 111 cut through the top and bottom sides thereof corresponding to the locating holes 102 of the mounting base 1. The circuit board 12 has a center opening 120 corresponding to the center opening 101 of the mounting base 1 and the center opening 110 of the spacer member 11 and a plurality of electrode pins 121 spaced around the center opening 120. The electrode pins 121 have the respective top and bottom ends thereof respectively extended out of the top and bottom walls of the circuit board 12.

The light-emitting unit 2 comprises a holder member 21. The holder member 21 has a holding chamber 210 defined therein, a center opening 211 cut through the bottom wall of the holding chamber 210, a plurality of round holes 2101 cut through the bottom wall of the holding chamber 210 and equiangularly spaced around the center opening 211, and a locating flange 214 extending around an outside wall 213 thereof. The holder member 21 further has a cushion ring 212 attached to the bottom side thereof. The light-emitting unit 2 further comprises a circuit substrate 22 mounted in the holding chamber 210 inside the holder member 21 and carrying a circuit layout, a plurality of light-emitting devices 221 arranged in an array on one side of the circuit substrate 22, a plurality of tubular electrodes 222 located on and extended out of the circuit substrate 22 corresponding to the round holes 2101 of the holder member 21 and electrically connected with the light-emitting devices 221, a packing lens 23 molded on the circuit substrate 22 over the light-emitting devices 221 and bonded to the holding chamber 210 of the holder member 21 and having a transmissive face 231 through which the light emitted by the light-emitting devices 221 passes, a flat heat sink 24 attached to the other side of the circuit substrate 22 for absorbing waste heat from the circuit substrate 22 and the light-emitting devices 221 and a cooling pad 25 attached to one side of the flat heat sink 24 opposite to the circuit substrate 22 for quick dissipation of waste heat.

The holding-down device 3 is adapted for fastening to the mounting base 1 to hold down the light-emitting unit 2.

Further, a positioning unit 4 may be provided between an inside wall 103 of the mounting base 1 and the outside wall 213 of the holder member 21 to guide positioning of the holder member 21 in the mounting base 1 and to prohibit rotation of the holder member 21 relative to the mounting base 1. According to this embodiment, the positioning unit 4 comprises a plurality of positioning ribs 41 longitudinally located on the inside wall 103 of the mounting base 1 and a plurality of positioning grooves 42 longitudinally located on the outside wall 213 of the holder member 21 for receiving the positioning ribs 41 respectively. The positioning ribs 41 can be dovetailed ribs, and the positioning grooves 42 can be dovetailed grooves for receiving the dovetailed positioning ribs 41. Alternatively, the positioning unit 4 can be a positioning structure comprising a plurality of sliding blocks and a plurality of sliding grooves matching the sliding blocks. Further, the bottom ends of the electrode pins 121 of the circuit board 12 that is accommodated in the accommodation chamber 10 of the mounting base 1 are respectively inserted the through holes 111 of the spacer member 11 and the locating holes 102 of the mounting base 1 for connection to an external power source to obtain the necessary working electrical power.

During installation of the light-emitting unit adapter module, the circuit board 12 is inserted into the accommodation chamber 10 of the mounting base 1 to force the bottom ends of the electrode pins 121 through the locating holes 102 of the mounting base 1 for connection to an external power source, and then the light-emitting unit 2 is inserted into the accommodation chamber 10 of the mounting base 1 to press-fit the tubular electrodes 222 of the circuit substrate 22 onto the electrode pins 121 of the circuit board 12 and to force the flat heat sink 24 and the cooling pad 25 through the center opening 120 of the circuit board 12, the center opening 110 of the spacer member 11 and the center opening 101 of the mounting base 1 to the outside of the mounting base 1. Further, when inserting the light-emitting unit 2 into the accommodation chamber 10 of the mounting base 1, the positioning ribs 41 of the positioning unit 4 are respectively engaged into the respective positioning grooves 42, thereby prohibiting rotation of the light-emitting unit 2 relative to the mounting base 1.

After installation of the light-emitting unit 2 in the accommodation chamber 10 of the mounting base 1, the holding-down device 3 is fastened to the mounting base 1 to hold down the light-emitting unit 2 in the mounting base 1, keeping the respective tubular electrodes 222 of the circuit substrate 22 in positive contact with the respective electrode pins 121 of the circuit board 12 for transmission of electrical power from the external power source to the light-emitting devices 221 at the circuit substrate 22.

Further, the aforesaid light-emitting devices 221 can be LED lamps, high-power light-emitting diodes, light-emitting chips, or surface mount light-emitting diodes.

The holding-down device 3 is a holding-down cap 31 having an annular inside stop flange 312 extending around an inside wall 311 thereof for stopping against the locating flange 214 of the holder member 21.

Further, the connection unit 5 is provided between the outside wall of the connection portion 13 of the mounting base 1 and the inside wall 311 of the holding-down cap 31, comprising an outer thread 51 formed integral with and extending around the outside wall of the connection portion 13 of the mounting base 1 and an inner thread 52 formed integral with and extending around the inside wall 311 of the holding-down cap 31 for threading into the outer thread 51. Any other connection structure, for example, a connection structure consisting of male retaining members and female retaining members may be used to substitute for the aforesaid screw joint type connection structure. After fixation of the holding-down cap 31 to the mounting base 1 by the connection unit 5, the annular inside stop flange 312 of the holding-down cap 31 is stopped against the locating flange 214 of the holder member 21 to hold down the light-emitting unit 2 in the mounting base 1 and to keep the tubular electrodes 222 of the circuit substrate 22 in positive contact with the respective electrode pins 121 of the circuit board 12 for power transmission.

Further, holding-down screws, holding-down spring screws, buckles or any other retainer means may be used to substitute for the holding-down cap 31 for holding down the light-emitting unit 2 in the accommodation chamber 10 of the mounting base 1.

Figure 6:
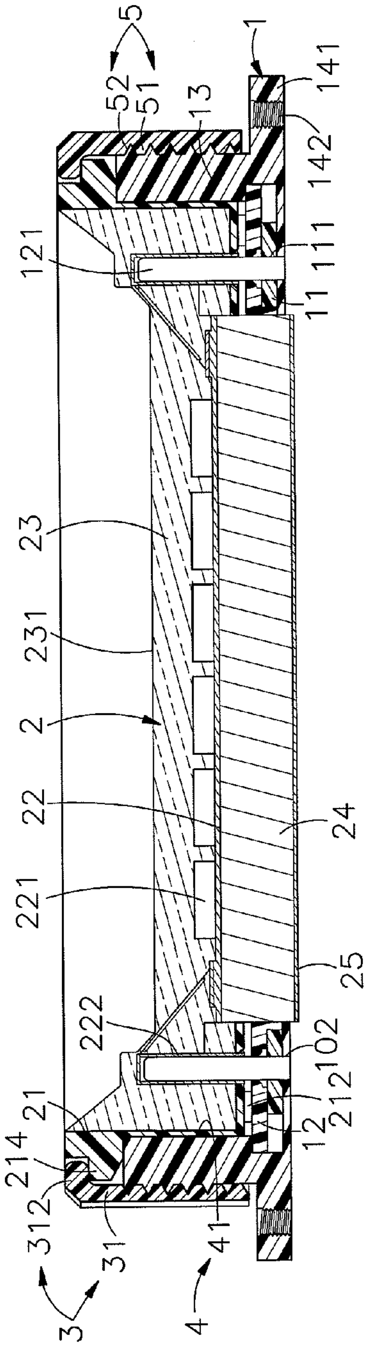
FIG. 6 is a sectional assembly view of the light-emitting unit adapter module in accordance with the present invention.
Figure 7:
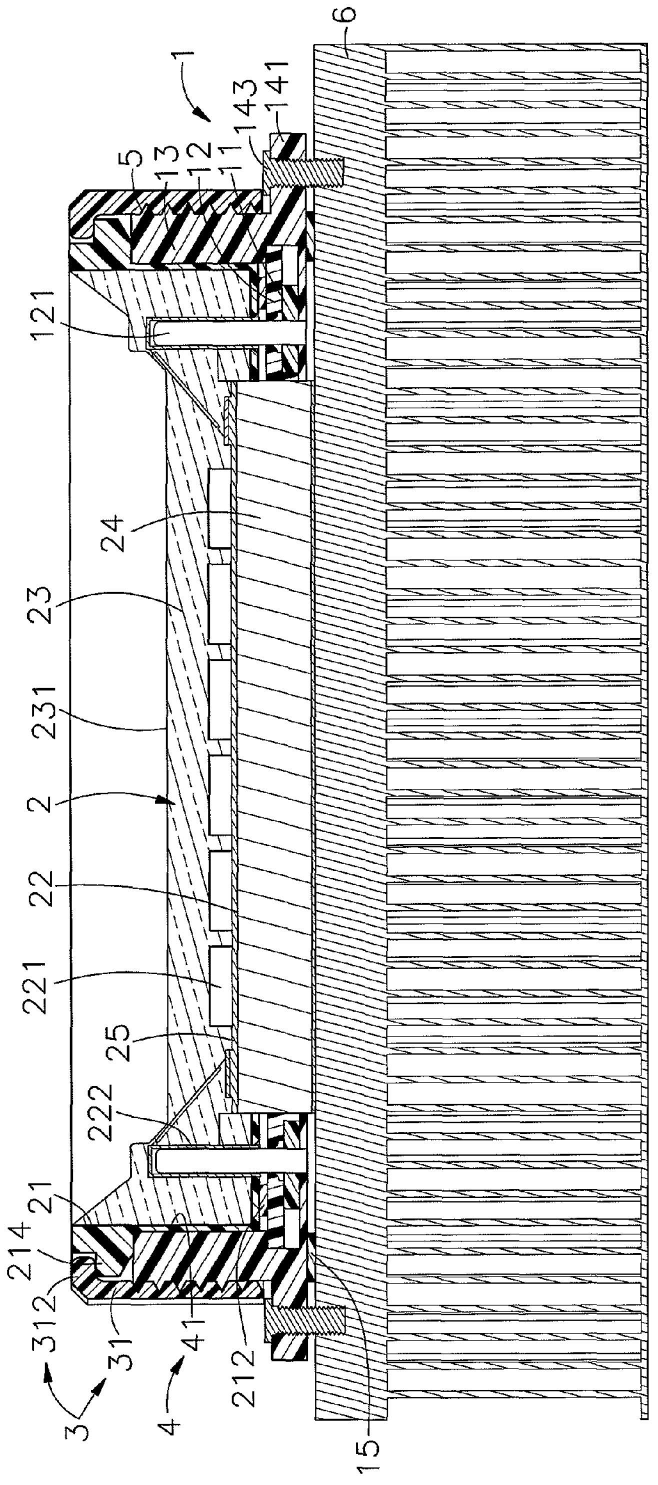
FIG. 7 is a sectional view of the present invention, showing the light-emitting unit adapter module fastened to an external heat sink.
Figure 8:
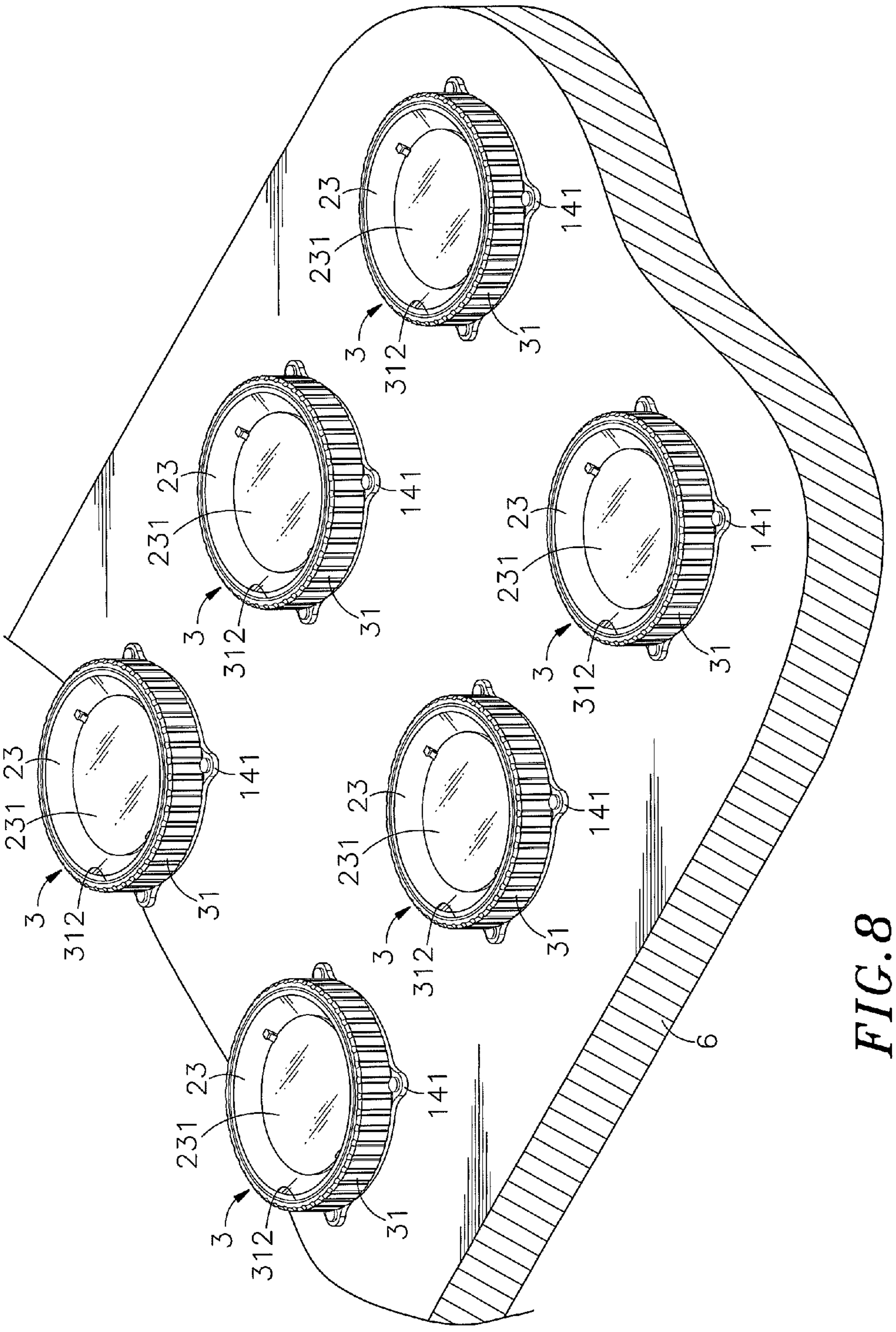
FIG. 8 is an applied view of the present invention, showing multiple light-emitting units adapter modules fastened to an external heat sink.

Referring to FIGS. 6~8 and FIGS. 2, 4 and 5 again, when the light-emitting unit adapter module is assembled, the holding-down cap 31 is firmly secured to the mounting base 1 by the connection unit 5 to hold down the light-emitting unit 2 in the accommodation chamber 10 of the mounting base 1, and the light-emitting unit 2 is kept in the accommodation chamber 10 inside the mounting base 1 and electrically connected to the circuit board 12. Thus, the whole assembly of the light-emitting unit adapter module has a compact characteristic convenient for installation in a lamp bulb, lamp housing, tubular lampshade or lighting fixture for emitting light by means of the light-emitting devices 221 of the light-emitting unit 2. Further, multiple light-emitting unit adapter modules can be used together in a lighting fixture. If one of the light-emitting units 2 of the light-emitting unit adapter modules failed, the user can disengage the inner thread 52 of the failed light-emitting unit adapter module from the associating outer thread 51 and then open the holding-down cap 31 of the failed light-emitting unit adapter module from the associating mounting base 1, and then take the failed light-emitting unit 2 out of the associating mounting base 1 for a replacement. Thereafter, the new light-emitting unit 2 is put in the mounting base 1 to force the tubular electrodes 222 of the new light-emitting unit 2 onto the electrode pins 121 of the circuit board 12 in the mounting base 1, and then fasten the holding-down cap 31 to the mounting base 1 again by means of threading the inner thread 52 into the outer thread 51. Thus, the replacement work is done rapidly. The light-emitting unit adapter module can be affixed to an external heat sink 6, keeping the cooling pad 25 in close contact with the surface of the external heat sink 6 for quick transfer of waste heat from the light-emitting devices 221 through the flat heat sink 24 and cooling pad 25 to the external heat sink 6 for quick dissipation. Further, before fixation of the light-emitting unit adapter module to the external heat sink 6, a gasket ring 15 is mounted in between the mounting base 1 and the external heat sink 6 around the flat heat sink 24 and the cooling pad 25 to seal off outside moisture.

Further, each mounting lug 141 of the mounting base 1 has a mounting through hole 142. Fastening members, for example, screws 143 are inserted through the mounting through holes 142 of the mounting lugs 141 of the mounting bases 1 of multiple light-emitting unit adapter modules and driven into an external support means, for example, circuit board, lamp holder, lighting fixture, support frame, or external heat sink 6 to affix these multiple light-emitting unit adapter modules to, for example, the external heat sink 6 (see FIGS. 7 and 8). It is to be understood that other known mounting techniques may be used to substitute for the screws 143 for affixing the mounting bases 1 of the light-emitting unit adapter modules to the external heat sink 6. Further, when one or a limited number of the light-emitting devices 221 of one particular light-emitting unit 2 failed, the holding-down cap 31 of the light-emitting unit adapter module in question can be removed from the associating mounting base 1 for quick replacement of the failed light-emitting unit 2. Thus, the invention facilitates repair and replacement works, saving much maintenance time and labor.

As indicated above, the invention provides a light-emitting device holding-down structure, which comprises a mounting base 1 holding a spacer member 11 and a circuit board 12 in an accommodation chamber 10 therein, a light-emitting unit 2 mounted in the accommodation chamber 10 inside the mounting base 1 and having tubular electrodes 222 respectively press-fitted onto respective electrode pins 121 of the circuit board 12, and a holding-down device 3 fastened to the mounting base 1 by means of a connection unit 5 to hold down the light-emitting unit 2, for enabling the flat heat sink 24 and cooling pad 25 of the light-emitting unit 2 to be exposed to the outside of the mounting base 1 for dissipation of waste heat. During installation of the mounting base 1 in an external device, a gasket ring 15 is provided at the bottom side of the mounting base 1 to seal off outside moisture.

In conclusion, the invention provides a light-emitting unit adapter module, which has the advantages and features as follows:

1. After installation of the mounting base 1 in a lamp, hand light or any of a variety of lighting fixtures, the holding-down device 3 is detachably fastened to the mounting base 1 to hold down the light-emitting unit 2 in the mounting base 1. When the light-emitting unit 2 failed, the failed light-emitting unit 2 can be easily and rapidly removed from the mounting base 1 for a replacement, saving much the repair time and labor.

2. When mounting the mounting base 1 of the light-emitting unit adapter module on an external heat sink 6, a gasket ring 15 is set in between the mounting base 1 and the external heat sink 6 around the flat heat sink 24 and cooling pad 25 of the light-emitting unit 2 to seal off outside moisture.

3. When the light-emitting unit adapter module is assembled, the holding-down device 3 is fastened to the mounting base 1 to hold down the light-emitting unit 2 in the mounting base 1, and the flat heat sink 24 and cooling pad 25 of the light-emitting unit 2 are kept suspending outside the mounting base 1. After installation of the light-emitting unit adapter module in an external heat sink 6, the cooling pad 25 is kept in close contact with the surface of the external heat sink 6 for quick transfer of waste heat from the light-emitting devices 221 through the flat heat sink 24 and the cooling pad 25 to the external heat sink 6 rapidly for quick dissipation, preventing heat accumulation in the mounting base 1 and prolonging the service life of the light-emitting unit 2.

4. The mounting base 1 has multiple mounting portions 14, for example, mounting lugs 141 spaced around the outside wall for fixation to an external heat sink, circuit board, lamp holder or support frame by fastening members, for example, screws 143. Thus, it is easy to mount and dismount the light-emitting unit adapter module. When a repair or replacement work is necessary, the light-emitting unit adapter module can be opened directly for repairing or replacing the internal component parts without changing the external circuit board, lamp holder or lighting fixture parts.

5. When fastened up the holding-down device 3 to hold down the light-emitting unit 2 in the mounting base 1, the tubular electrodes 222 of the circuit substrate 22 of the light-emitting unit 2 are kept in contact with the respective electrode pins 121 of the circuit board 12 in the mounting base 1 positively, assuring stable transmission of electrical power to the light-emitting unit 2.

A prototype of light-emitting unit adapter module has been constructed with the features of FIGS. 1~8. The light-emitting unit adapter module functions smoothly to provide all of the features disclosed earlier.

Although a particular embodiment of the invention has been described in detail for purposes of illustration, various modifications and enhancements may be made without departing from the spirit and scope of the invention. Accordingly, the invention is not to be limited except as by the appended claims.

What the invention claimed is:

1. A light-emitting unit adapter module, comprising:

a mounting base, said mounting base having an accommodation chamber defined therein, a center opening cut through a bottom wall of said accommodation chamber, a plurality of locating holes cut through the bottom wall of said accommodation chamber and equiangularly spaced around the center opening of said mounting base and a connection portion extending around the periphery of said accommodation chamber;

a circuit board accommodated in said accommodation chamber inside said mounting base, said circuit board having a center opening corresponding to the center opening of said mounting base and a plurality of electrode pins electrically connectable to an external power source;

a light-emitting unit mountable in said accommodation chamber of said mounting base, said light-emitting unit comprising a holder member insertable into said accommodation chamber of said mounting base, said holder member having a holding chamber defined therein and a center opening cut through a bottom side thereof in communication with said holding chamber, a circuit substrate accommodated in said holding chamber of said holder member, a plurality of light-emitting devices mounted on said circuit substrate, a plurality of electrodes mounted in said circuit substrate and electrically connected with said light-emitting devices and electrically connectable to said electrode pins of said circuit board upon insertion of said light-emitting unit into said accommodation chamber of said mounting base, a packing lens molded on said circuit substrate over said light-emitting devices, and a flat heat sink fixedly provided at a bottom side of said circuit substrate and extending through the center opening of said holder member for insertion through the center opening of said mounting base to the outside of said mounting base upon insertion of said light-emitting module into said accommodation chamber of said mounting base.

2. The light-emitting unit adapter module as claimed in claim 1, further comprising a spacer member mounted in said accommodation chamber of said mounting base and supported between the bottom wall of said accommodation chamber and a bottom wall of said circuit board.

3. The light-emitting unit adapter module as claimed in claim 1, wherein said mounting base has a plurality of mounting portions outwardly protruded from and equiangularly spaced around the connection portion thereof for mounting.

4. The light-emitting unit adapter module as claimed in claim 1, further comprising a holding-down device fasten to said mounting base to hold down said light-emitting unit in said accommodation chamber of said mounting base.

5. The light-emitting unit adapter module as claimed in claim 4, wherein said holder member has a locating flange extending around the periphery thereof; said holding-down device comprises a holding-down cap for fastening to said mounting base to hold down said light-emitting unit in said accommodation chamber of said mounting base, said holding-down cap having an annular inside stop flange extending around an inside wall thereof for stopping against the locating flange of said holder member.

6. The light-emitting unit adapter module as claimed in claim 4, further comprising a connection unit adapted for securing said holding-down cap to said mounting base, said connection unit comprising an outer thread extending around the periphery of said mounting base and an inner thread extending around the inside wall of said holding-down cap for threading into said outer thread.

7. The light-emitting unit adapter module as claimed in claim 1, further comprising a positioning unit arranged between said mounting base and said holder member of said light-emitting unit to prohibit rotation of said light-emitting unit relative to said mounting base.

8. The light-emitting unit adapter module as claimed in claim 7, wherein said positioning unit comprises a plurality of male positioning members located on an inside wall of said mounting base and a plurality of female positioning members located on an outside wall of said holder member for receiving said male positioning members to prohibit rotation of said light-emitting unit relative to said mounting base.

9. The light-emitting unit adapter module as claimed in claim 8, wherein said male positioning members of said positioning unit are positioning ribs longitudinally located on the inside wall of said mounting base and equiangularly spaced around the inside wall of said mounting base; said female positioning members of said positioning unit are positioning grooves longitudinally located on the outside wall of said holder member and equiangularly spaced around the outside wall of said holder member for receiving said positioning ribs.

10. The light-emitting unit adapter module as claimed in claim 1, wherein said light-emitting unit further comprises a cooling pad bonded to a bottom wall of said flat heat sink opposite to said circuit substrate and suspending outside said holder member.

* * * * *